(12) United States Patent
Humer et al.

(10) Patent No.: US 11,686,313 B2
(45) Date of Patent: Jun. 27, 2023

(54) FLUID PUMPING SYSTEM

(71) Applicant: HANON SYSTEMS EFP DEUTSCHLAND GMBH, Bad Homburg v. d. Höhe (DE)

(72) Inventors: Christian Humer, Garsten (AT); Viktor Racz, St. Valentin (AT); Michael Wadsack, Amstetten (AT)

(73) Assignee: HANON SYSTEMS EFP DEUTSCHLAND GMBH, Bad Homburg v. d. Höhe (DE)

( * ) Notice: Subject to any disclaimer, the term of this patent is extended or adjusted under 35 U.S.C. 154(b) by 392 days.

(21) Appl. No.: 17/045,864

(22) PCT Filed: Mar. 6, 2019

(86) PCT No.: PCT/EP2019/055552
§ 371 (c)(1),
(2) Date: Oct. 7, 2020

(87) PCT Pub. No.: WO2019/214864
PCT Pub. Date: Nov. 14, 2019

(65) Prior Publication Data
US 2021/0140433 A1  May 13, 2021

(30) Foreign Application Priority Data
May 7, 2018 (DE) .................. 10 2018 207 001.6

(51) Int. Cl.
*F04D 13/02* (2006.01)
*F04D 13/06* (2006.01)
(Continued)

(52) U.S. Cl.
CPC ............ *F04D 13/028* (2013.01); *B60K 6/365* (2013.01); *B60K 6/383* (2013.01); *F02B 33/34* (2013.01);
(Continued)

(58) Field of Classification Search
CPC .......... F02B 39/04; F02B 39/10; F02B 39/12; F02B 33/40; F02B 33/34; Y02T 10/62;
(Continued)

(56) References Cited

U.S. PATENT DOCUMENTS 2,908,189 A * 10/1959 Parker .................... F02C 7/275
  60/788
5,423,304 A * 6/1995 Lawrence .............. F02B 39/14
  415/122.1
(Continued)

FOREIGN PATENT DOCUMENTS

CN         1836107 A    9/2006
CN       101392741 A    3/2009
(Continued)

OTHER PUBLICATIONS

Office Action regarding German Patent Application No. 102018207001.6, dated Nov. 9, 2020.
(Continued)

*Primary Examiner* — Peter J Bertheaud
(74) *Attorney, Agent, or Firm* — Harness, Dickey & Pierce, P.L.C.

(57) ABSTRACT

Fluid pumping system for a vehicle with an internal combustion engine, the fluid pumping system comprising: a housing; an electric motor; a planetary gear with a first member that can be driven by the internal combustion engine, a second member driven by the electric motor, and a third member; and a pump driven by the third element of the planetary gear set, the housing being closed by a pump flange and a pulley with pulley cover, wherein at least the pulley and/or a ring gear disposed in the pulley is made of plastic.

11 Claims, 2 Drawing Sheets

(51) Int. Cl.
- *F02B 33/40* (2006.01)
- *B60K 6/383* (2007.10)
- *F02B 33/34* (2006.01)
- *B60K 6/365* (2007.10)
- *F02B 39/10* (2006.01)
- *F02B 39/04* (2006.01)
- *F04D 25/02* (2006.01)
- *F16H 1/28* (2006.01)
- *F04D 25/06* (2006.01)
- *F16H 47/04* (2006.01)
- *F04D 29/049* (2006.01)

(52) U.S. Cl.
CPC .............. *F02B 33/40* (2013.01); *F02B 39/04* (2013.01); *F02B 39/10* (2013.01); *F04D 13/06* (2013.01); *F04D 25/028* (2013.01); *F04D 25/0606* (2013.01); *F16H 1/28* (2013.01); *F16H 47/04* (2013.01); *F04D 29/049* (2013.01); *Y02T 10/12* (2013.01); *Y02T 10/62* (2013.01)

(58) Field of Classification Search
CPC ........ Y02T 10/12; B60K 6/365; B60K 6/383; F16H 1/28; F16H 47/04; F04D 25/028; F04D 13/028; F04D 25/06; F04D 13/06; F04D 25/0606; F04D 29/049
See application file for complete search history.

(56) References Cited

U.S. PATENT DOCUMENTS 8,714,942 B2 * 5/2014 Lutoslawski ........... F04C 14/08
417/319
2012/0269653 A1 10/2012 Lutoslawski et al.

FOREIGN PATENT DOCUMENTS

| CN | 102459844 A | 5/2012 |
| DE | 19941705 A1 | 3/2000 |
| DE | 10125692 A1 | 11/2002 |
| DE | 10125705 A1 | 11/2002 |
| DE | 10214637 A1 | 10/2003 |
| DE | 102013211813 A1 | 7/2014 |
| EP | 1801386 A1 | 6/2007 |
| WO | 2006089376 A1 | 8/2006 |

OTHER PUBLICATIONS

Office Action regarding Chinese Patent Application No. 20198003119.5, dated Nov. 30, 2021.

Office Action regarding Korean Patent Application No. 20207029581, dated Dec. 27, 2021.

* cited by examiner

FLUID PUMPING SYSTEM

CROSS-REFERENCE TO RELATED APPLICATIONS

This application is a U.S. National Phase Application under 35 U.S.C. 371 of International Application No. PCT/EP2019/055552, filed Mar. 6, 2019, which claims the benefit of German Patent Application No. 10 2018 207 001.6, filed May 7, 2018. The entire disclosures of each of the above applications are incorporated herein by reference.

FIELD

The disclosure relates to a fluid pumping system for a vehicle with an internal combustion engine, the fluid pumping system comprising: a housing; an electric motor; a planetary gear with a first member that can be driven by the internal combustion engine, a second member driven by the electric motor, and a third member; and a pump driven by the third element of the planetary gear set, the housing being closed by a pump flange and a pulley with pulley cover.

BACKGROUND

This section provides background information related to the present disclosure which is not necessarily prior art.

Many motor vehicles are equipped with a pump to transfer fluid under pressure to a number of points in the vehicle. Most of the vehicles currently in production are equipped with one or more pumps that are driven by the vehicle's internal combustion engine. Examples of such pumps include fuel pumps, water pumps, combustion engine oil pumps, transmission oil pumps, superchargers, turbochargers, power steering pumps, air conditioning compressors, and fluid pumps that supply flow to actuation systems for devices such as automatic transmissions, transfer cases, clutches, and many other vehicle pumping requirements.

For example, many pumps are configured as fixed displacement pumps to minimise the costs of the arrangement. The fixed displacement pump is typically dimensioned so as to provide a maximum flow rate and maximum pressure based on peak system demand. However, peak demand is not necessary during a large part of vehicle operation. Therefore, the pump inefficiently delivers a relatively high output when a relatively low output is required. The energy consumed in providing the higher output rather than a lower output may be regarded as wasted energy. Furthermore, some newer vehicle configurations, including hybrid vehicles, do not use the internal combustion engine at all times. To achieve maximum fuel economy, the hybrid vehicle's internal combustion engine may be switched off and on many times during vehicle operation.

It may therefore be undesirable for the internal combustion engine to be the fluid pumps' only source of energy. Pumps driven by electric motors can also be used within automotive applications. However, a pump driven solely by an electric motor typically does not deliver the same operating efficiency as a pump driven mechanically by the internal combustion engine. Hence, there may be a technological need for a pump with a dual energy source to improve the vehicle's energy efficiency and provide pumped fluids during different modes of vehicle operation as and when required.

From U.S. Pat. No. 8,714,942 B2, a fluid pumping system for a vehicle with an internal combustion engine is known, which comprises an electric motor and a planetary gear set with a first element that can be driven by the internal combustion engine, a second element driven by the electric motor, and a third element. A pump is driven by the third element of the planetary gear set. The chain wheel that it uses is formed in one piece with the ring gear of the planetary gear. The electric motor drives the planet carrier of the planetary gear via a hollow shaft, the fluid pump shaft being connected to the sun gear.

SUMMARY

This section provides a general summary of the disclosure, and is not a comprehensive disclosure of its full scope or all of its features.

It is the object of the disclosure to provide a fluid pumping system of cost-effective design.

The object is solved with a fluid pumping system for a vehicle with an internal combustion engine, the fluid pumping system comprising: a housing; an electric motor; a planetary gear with a first member that can be driven by the internal combustion engine, a second member driven by the electric motor, and a third member; and a pump driven by the third element of the planetary gear set, the housing being closed by a pump flange and a pulley with pulley cover, wherein at least the pulley and/or a ring gear disposed in the pulley is made of plastic. Cost-effective production is easily possible due to the special shape of the pulley.

It is particularly advantageous if the pulley is made of sheet metal. A component made of sheet metal can be produced in complex shapes by different manufacturing processes and therefore allows the solution according to the disclosure to be realised in a particularly optimal way.

Using sheet metal to produce the pulley results in an advantageous solution if the ring gear is made of plastic and pressed into the pulley. It is advantageous for the ring gear to be connected to the pulley cover in a positionally secure manner via at least one recess and/or a nose.

Such a connection allows easy assembly of the pulley cover while ensuring the positioning of the components in relation to each other.

A particularly simple solution is one in which the pulley and the ring gear are made in one piece from plastic. It is advantageous for the pulley to form a mounting space for a planetary gear. Due to the simple design of the pulley, it is possible for the pulley to form a contact surface which, together with part of the housing, forms a receptacle for a bearing.

Due to this special bearing arrangement, forces are transmitted directly to the housing and kept away from the shaft.

Due to the special bearing arrangement of the pulley, the pump can be sealed from the electric motor by radial shaft seals, making end-face mechanical seals unnecessary.

The special bearing arrangement also allows the pump's impeller to be supported by a double-row ball bearing, thereby saving installation space.

DRAWINGS

The drawings described herein are for illustrative purposes only of selected embodiments and not all possible implementations, and are not intended to limit the scope of the present disclosure. The disclosure is described below by way of example, with reference to the attached drawings.

Corresponding reference numerals indicate corresponding parts throughout the several views of the drawings.

DETAILED DESCRIPTION

Example embodiments will now be described more fully with reference to the accompanying drawings.

Figure 1:
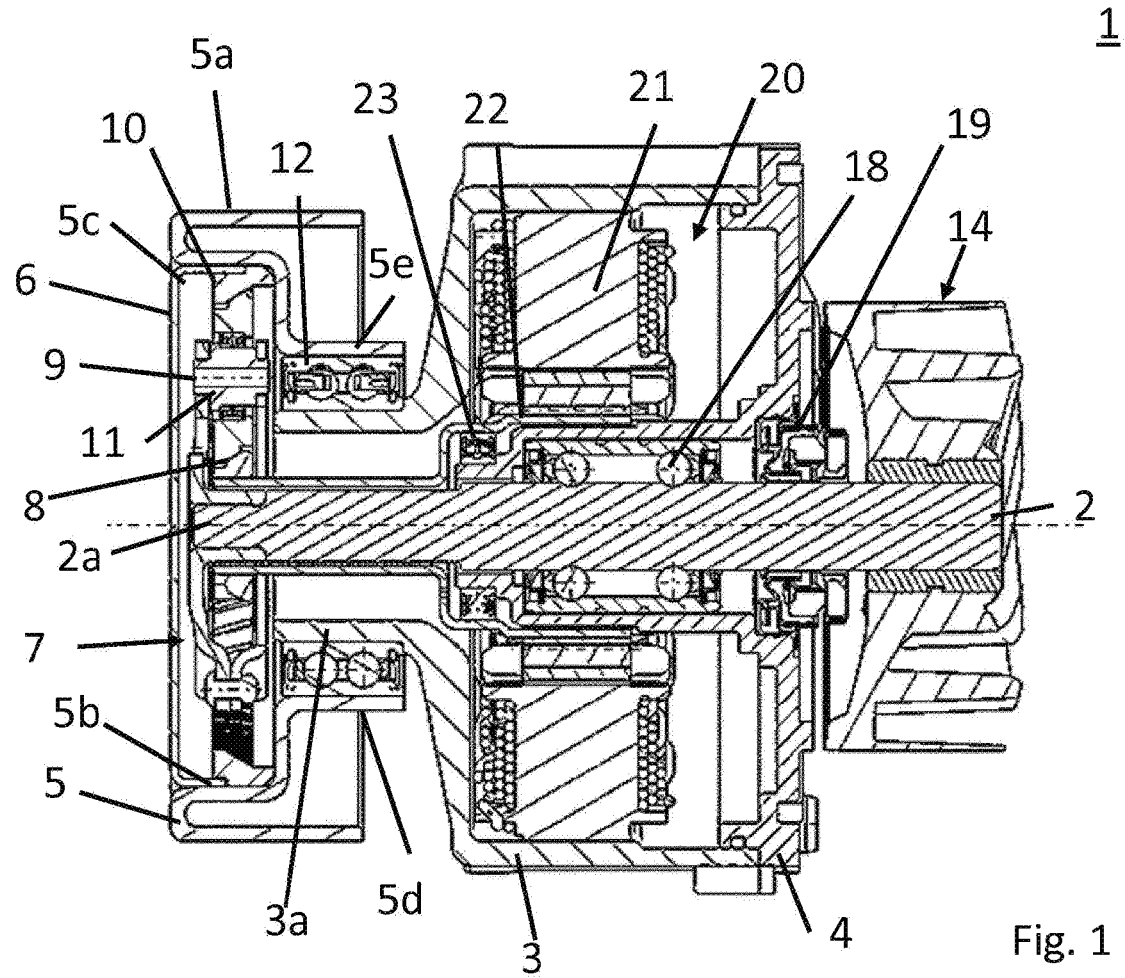
FIG. 1 shows a schematic diagram of the exemplary embodiment.
Figure 2:
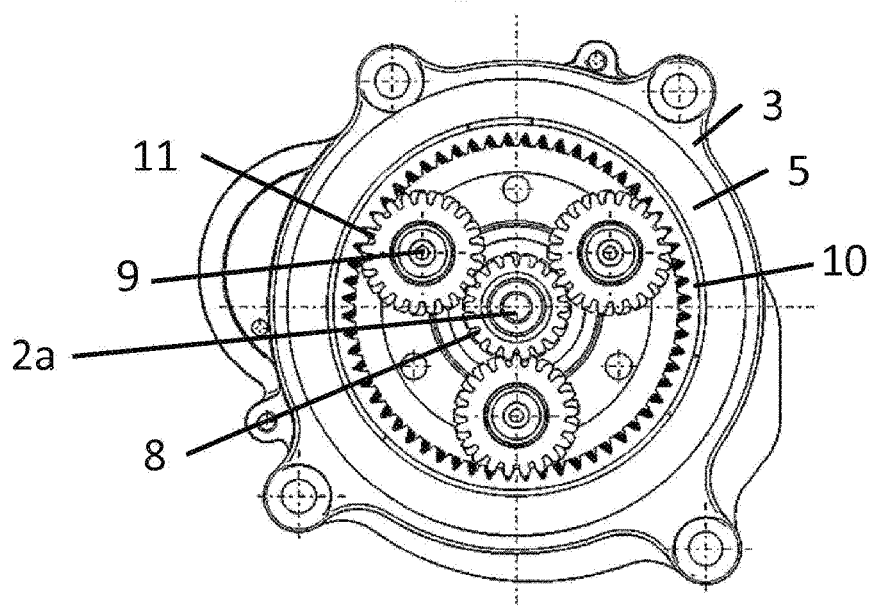
FIG. 2 shows an overhead view of the planetary gear.
Figure 3:
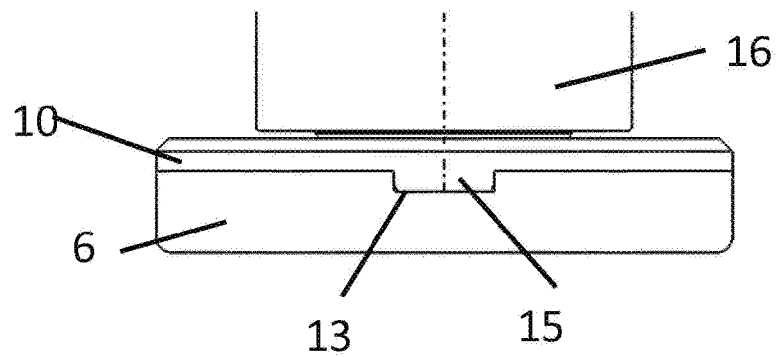
FIG. 3 shows a section through a pulley.
Figure 4:
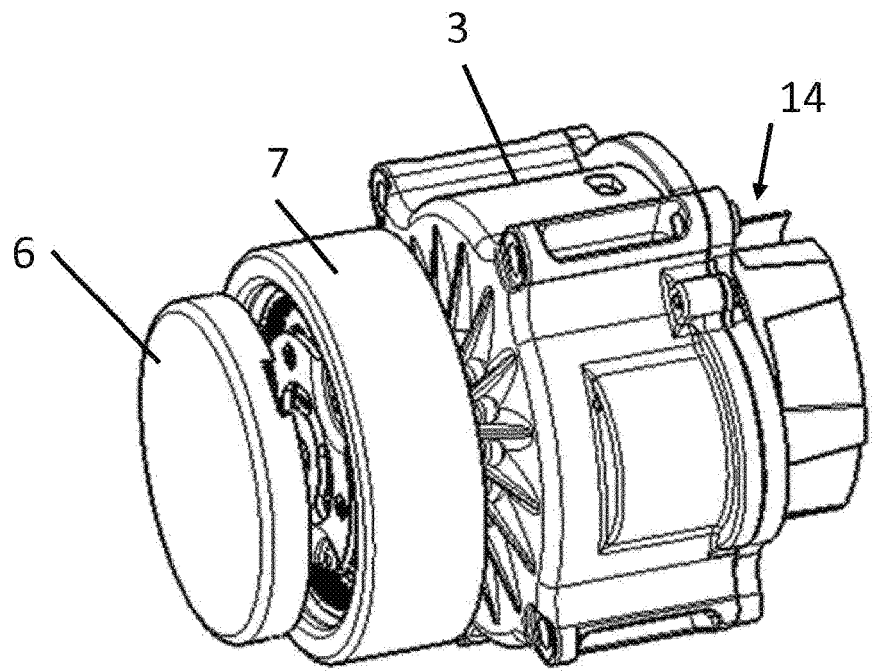
FIG. 4 shows a view of the fluid pumping system.

FIG. 1 shows the schematic structure of the fluid pumping system 1 consisting of a pump housing 3 which is closed by a pump flange 4. The fluid pumping system 1 has three main components. The pump 14 of the fluid pumping system is disposed on the right-hand side along a shaft 2. In the centre is an electric motor 20, being a BLDC motor. This has a stator 21 and a rotor 22 designed as a hollow shaft. Inside the stator is a sealing wall 4a of a pump flange 4, which seals the electric motor 20 against moisture. A pulley 5 is disposed on the left-hand side in the end area 2a of the shaft 2. The pulley 5 is designed to contain a reduction gear in the form of a planetary gear 7. The pulley 5 is a component that is bent from a piece of sheet metal. It has an outer circumference 5a, which serves as a friction surface for a belt drive via an internal combustion engine. The pulley 5 furthermore has an inwardly reduced circumference 5b, wherein an installation space 5c is formed to accommodate the planetary gear 7. With a further circumferential reduction to a circumference 5d, the pulley forms a contact surface 5e for a bearing 16. In this embodiment, the pulley has a smooth outer circumference 5a, but a design with a textured surface for a textured drive belt is also conceivable. A ring gear 10 for the planetary gear 7 is pressed into the installation space 5c of the pulley 5.

The ring gear 10 is made of a plastic material that is pressed into the pulley. A planetary gear cover 6, also made of sheet metal, serves to cover the planetary gear 7. The planetary gear cover has one or more recesses 13 which are designed to engage with the nose(s) 15 of the plastic ring gear 10.

When the fluid pump is driven by the internal combustion engine via the pulley 5, the pulley 5 rotates with the pressed-in ring gear 10 and the planetary gear cover 6. The planetary gear 7 further consists of a planet carrier 9 on which the planet 11 is rotatably mounted, and a sun gear 8. The sun gear 8 is connected to the shaft 2 in a rotationally fixed manner.

Together with an axially extending area 3a of the pump housing 3, the pulley also forms a mounting space 17 for the bearing 16, which here is a double ball bearing. This bearing arrangement of the pulley by means of a double-row ball bearing on the housing provides power transmission via the housing structure rather than via the functional drive of the fluid pumping system 1, i.e. via the planet carriers 9, the shaft 2 and the bearings of the pump. This reduces the load on the mechanical sealing of the water pump as it improves concentricity, therefore radial shaft seals 19 can be used instead of a conventional mechanical end-face seal. The use of a double-row ball bearing 18 for the impeller bearing of the fluid pump saves axial installation space compared to a bearing assembly consisting of a ball bearing with a needle bearing as used in the past. The shaft 2 is supported by a single bearing point 23.

In an alternative embodiment, the pulley 5 is not made from sheet metal, but is injection moulded from plastic together with the ring gear 10.

The fluid pumping system can be operated by means of the coupled mechanical and electrical drive. Mechanical drive is provided by a belt drive and the pulley 5, while electrical drive is provided by the BLDC motor. The drive function is coupled to the superimposing gear, i.e. the planetary gear 7, which couples the belt drive and the electric drive directly to one another.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The inventon claimed is:

1. A fluid pumping system for a vehicle with an internal combustion engine, the fluid pumping system comprising: a housing; an electric motor; a planetary gear set with a first member that can be driven by the internal combustion engine, a second member driven by the electric motor, and a third member; and a pump driven by the third element of the planetary gear set, the housing being closed by a pump flange and a pulley with pulley cover, wherein the pulley forms a contact surface which, together with an axially extending area of the housing, forms a receptacle for a bearing.

2. The fluid pumping system according to claim 1, wherein the pulley is made of sheet metal.

3. The fluid pumping system according to claim 1, wherein the ring gear is made of plastic and can be pressed into the pulley.

4. The fluid pumping system according to claim 1, wherein the pulley and the ring gear are made in one piece from plastic.

5. The fluid pumping system according to claim 1, wherein the pulley forms a mounting space for a planetary gear.

6. The fluid pumping system according to claim 1, wherein the pump is sealed from the electric motor by means of radial shaft seals.

7. The fluid pumping system according to claim 1, wherein an impeller of the pump is supported by a double-row ball bearing.

8. The fluid pumping system according to claim 1, wherein a shaft is supported by a single bearing point.

9. The fluid pumping system according to claim 1, wherein the pulley and/or a ring gear disposed in the pulley is made of plastic.

10. A fluid pumping system for a vehicle with an internal combustion engine, the fluid pumping system comprising: a housing; an electric motor; a planetary gear set with a first member that can be driven by the internal combustion engine, a second member driven by the electric motor, and a third member; and a pump driven by the third element of the planetary gear set, the housing being closed by a pump flange and a pulley with pulley cover, wherein the ring gear is connected to the pulley cover in a positionally secure manner via at least one recess and/or a nose.

11. The fluid pumping system according to claim 10, wherein the pulley and/or a ring gear disposed in the pulley is made of plastic.

* * * * *